(12) United States Patent
Kurose et al.

(10) Patent No.: US 9,189,713 B2
(45) Date of Patent: Nov. 17, 2015

(54) LETTER PRINTING SYSTEM

(71) Applicant: RISO KAGAKU CORPORATION, Tokyo (JP)

(72) Inventors: Tomohiro Kurose, Ibaraki-ken (JP); Toshio Akiyama, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 13/871,818

(22) Filed: Apr. 26, 2013

(65) Prior Publication Data

US 2013/0286412 A1 Oct. 31, 2013

(30) Foreign Application Priority Data

Apr. 27, 2012 (JP) ................................. 2012-102505

(51) Int. Cl.
*G06F 3/12* (2006.01)
*G06K 15/02* (2006.01)
*G06F 15/00* (2006.01)

(52) U.S. Cl.
CPC .......... *G06K 15/1848* (2013.01); *G06F 3/1211* (2013.01); *G06F 3/1244* (2013.01); *G06F 3/1252* (2013.01); *G06F 3/1285* (2013.01)

(58) Field of Classification Search
CPC . G06K 15/1848; G06F 3/1211; G06F 3/1244; G06F 3/1252; G06F 3/1285
See application file for complete search history.

(56) References Cited

U.S. PATENT DOCUMENTS

| 4,797,832 | A | * | 1/1989 | Axelrod et al. | ................ 700/227 |
| 6,985,245 | B1 | * | 1/2006 | Takahashi | .................... 358/1.15 |
| 2003/0164993 | A1 | * | 9/2003 | Bacher et al. | ................. 358/498 |
| 2006/0001686 | A1 | * | 1/2006 | Natori | ............................. 347/16 |
| 2006/0033956 | A1 | * | 2/2006 | Takahashi | .................... 358/1.15 |
| 2010/0049536 | A1 | * | 2/2010 | Quine et al. | ....................... 705/1 |
| 2010/0167895 | A1 | * | 7/2010 | Stemmle et al. | ............. 493/267 |
| 2010/0259790 | A1 | * | 10/2010 | Pagel | ........................... 358/1.15 |

FOREIGN PATENT DOCUMENTS

JP 2002-225379 A 8/2002

* cited by examiner

*Primary Examiner* — Marivelisse Santiago Cordero
*Assistant Examiner* — Daryl Jackson
(74) *Attorney, Agent, or Firm* — Studebaker & Brackett PC

(57) ABSTRACT

A letter printing system includes: a data processing unit for receiving an instruction to print document data containing letter data of a plurality of letters, generating print data and outputting the print data to a printing unit; and the printing unit for performing, for each letter, printing on a paper sheet for envelope and a paper sheet for enclosure according to the print data and outputting the paper sheets in the order of printing, wherein the data processing unit determines a letter boundary of each letter in the document data and sequentially outputs print data of each letter to the printing unit, and the printing unit adjusts the order of pieces of page data forming the print data of each letter according to a predetermined order of output of the paper sheet for envelope and the paper sheet for enclosure for performing inserting and sealing operation, and performs printing.

5 Claims, 6 Drawing Sheets

LETTER PRINTING SYSTEM

BACKGROUND OF THE INVENTION

1. Field of the Invention

The present invention relates to a letter printing system including a data processing unit, which receives an instruction to print document data containing letter data of a plurality of letters, generates print data from the document data and outputs the print data to a printing unit, and the printing unit, which performs printing on a paper sheet for envelope and a paper sheet for enclosure according to the print data inputted from the data processing unit and outputs the paper sheets in the order of printing.

2. Description of the Related Art

In recent years, letter producing systems are known. Such a letter producing system receives an instruction to print letter data, which is generated on a computer with an application program, such as Microsoft Word®, then, a printing unit of the system performs printing on a paper sheet for envelope and a paper sheet for enclosure, and an inserting and sealing unit of the system forms an envelope from the printed paper sheet for envelope and inserting and sealing the printed paper sheet for enclosure in the formed envelope, thereby producing a letter.

In a case where the inserting and sealing unit of the letter producing system is configured, for example, to automatically feed the paper sheets for one letter outputted from the printing unit in the order of output, recognize the first-fed paper sheet as a paper sheet for enclosure and the last-fed paper sheet as a paper sheet for envelope, form an envelope by folding the paper sheet recognized as the paper sheet for envelope, and insert and seal the paper sheet recognized as the paper sheet for enclosure in the formed envelope to produce a letter, it is necessary that the printing unit performs printing on the paper sheet for enclosure before printing on the paper sheet for envelope. However, letter data to be printed is usually generated without considering the order of printing to accommodate to the above-described inserting and sealing operation, and the order of page data for envelope and page data for enclosure forming the letter data often does not correspond to the order of printing accommodating to the inserting and sealing operation.

In order to address this problem, Japanese Unexamined Patent Publication No. 2002-225379 (hereinafter, Patent Document 1) proposes a method that allows printing page data in a predetermined order that is different from the order of the page data generated with an application program. In this method, when an instruction to print document data formed by pieces of page data is received, a printer driver once spools all the pieces of page data forming the document data sent from the application program and performs necessary sorting on the entire spooled data, and outputs the sorted data to the printing unit.

SUMMARY OF THE INVENTION

With the method disclosed in Patent Document 1, however, since all the pieces of page data forming the document data are once spooled and the entire spooled data is sorted, the start of printing is delayed, resulting in lower productivity. This problem is particularly noticeable when the number of pieces of page data forming the document data is large, and/or the size of each page data is large.

In view of the above-described circumstances, the present invention is directed to providing a letter printing system which, when an instruction to print document data containing letter data of a plurality of letters is received and the printing is performed, allows arranging the order of output of paper sheets from a printing unit to be appropriate for inserting and sealing operation while minimizing delay of the start of printing, thereby ensuring productivity.

An aspect of the letter printing system of the invention is a letter printing system including: a data processing unit for receiving an instruction to print document data containing letter data of a plurality of letters, generating print data from the document data and outputting the generated print data to a printing unit; and the printing unit for performing, for each letter, printing on a paper sheet for envelope and at least one paper sheet for enclosure according to the print data inputted from the data processing unit and outputting the paper sheet for envelope and the paper sheet for enclosure in the order of printing, wherein the data processing unit determines a letter boundary of each letter in the document data and sequentially outputs print data of each letter to the printing unit, and the printing unit adjusts the order of pieces of page data forming the print data of each letter inputted from the data processing unit according to a predetermined order of output of the paper sheet for envelope and the paper sheet for enclosure for performing inserting and sealing operation, and performs printing according to the adjusted print data.

The "print data of each letter" herein refers to data that allows printing of letter data of one letter and is readable by the printing unit.

In the letter printing system of the invention, if the printing unit outputs the paper sheet for envelope and the paper sheet for enclosure subjected to printing in face-up position and the page data for enclosure forming the print data of each letter includes two or more pieces of page data, the adjustment may include sorting the pieces of page data for enclosure in the reverse order.

In the letter printing system of the invention, the letter data of each letter may contain page data for one envelope and page data for at least one enclosure that are arranged in a predetermined order, and the data processing unit may receive an instruction to print document data containing letter data of two or more letters and sequentially determine, from the beginning of the document data, whether each of the page data for envelope and the page data for enclosure forming the document data is the page data is for envelope or for enclosure based on the page data. With respect to the third and the following pieces of page data, the data processing unit may further determine, for each piece of page data, whether or not a combination of a result of determination as to whether the current page data is for envelope or for enclosure and a result of determination as to whether the previous page data is for envelope or for enclosure satisfy a condition of a letter boundary, which is defined by the predetermined order. Then, if it is determined that the condition of the letter boundary is satisfied, the data processing unit may set a letter boundary between two pieces of page data involved in the determination, and output, to the printing unit, a set of page data between the previous letter boundary and the currently set letter boundary as data belonging to the print data of each letter.

The determination as to whether each page data is for envelope or for enclosure may be achieved based on some information in the page data, such as information described in the header field of the page data, or information described in the following data field. For example, the data processing unit may reference information of page size of the page data described in the header field. In this case, if the page size of the page data of interest is the same as a page size of page data for envelope which is set and stored in advance, it is determined that the page data of interest is for envelope, and if the page size is different from the page size of page data for envelope set and stored in advance, it is determined that the page data of interest is for enclosure.

In the letter printing system of the invention, the printing unit may eject the paper sheet for envelope and the paper sheet for enclosure subjected to printing in face-up position to the inserting and sealing unit that is configured to sequentially feed the paper sheets of one letter, which are outputted from the printing unit, in the order of output, recognize the first-fed paper sheet as the paper sheet for enclosure and the last-fed paper sheet as the paper sheet for envelope, fold the paper sheet recognized as the paper sheet for envelope to form an envelope, and insert and seal the paper sheet recognized as the paper sheet for enclosure in the formed envelope to produce a letter, and the adjustment may include sorting the pieces of page data forming the print data of each letter such the page data for enclosure comes first and the page data for envelope follows, and if the page data for enclosure includes two or more pieces of page data, further sorting the pieces of page data for enclosure in the reverse order.

In the letter printing system of the invention, the printing unit may eject the paper sheet for envelope and the paper sheet for enclosure subjected to printing in face-up position to the inserting and sealing unit that is configured to sequentially feed the paper sheets of one letter, which are outputted from the printing unit, in the order of output, recognize the first-fed paper sheet as the paper sheet for envelope and the following paper sheets as the paper sheets for enclosure, fold the paper sheet recognized as the paper sheet for envelope to form an envelope, and insert and seal the paper sheet recognized as the paper sheet for enclosure in the formed envelope to produce a letter, and the adjustment may include sorting the pieces of page data forming the print data of each letter so that the page data for envelope comes first and the page data for enclosure follows, and if the page data for enclosure includes two or more pieces of page data, further sorting the pieces of page data for enclosure in the reverse order.

In the letter printing system of the invention, the printing unit may eject the paper sheet for envelope and the paper sheet for enclosure subjected to printing in face-down position to the inserting and sealing unit that is configured to sequentially feed the paper sheets of one letter, which are outputted from the printing unit, in the order of output, recognize the first-fed paper sheet as the paper sheet for enclosure and the last-fed paper sheet as the paper sheet for envelope, fold the paper sheet recognized as the paper sheet for envelope to form an envelope, and insert and seal the paper sheet recognized as the paper sheet for enclosure in the formed envelope to produce a letter, and the adjustment may include sorting the pieces of page data forming the print data of each letter such the page data for enclosure comes first and the page data for envelope follows.

In the letter printing system of the invention, the printing unit may eject the paper sheet for envelope and the paper sheet for enclosure subjected to printing in face-down position to the inserting and sealing unit that is configured to sequentially feed the paper sheets of one letter, which are outputted from the printing unit, in the order of output, recognize the first-fed paper sheet as the paper sheet for envelope and the following paper sheet as the paper sheet for enclosure, fold the paper sheet recognized as the paper sheet for envelope to form an envelope, and insert and seal the paper sheet recognized as the paper sheet for enclosure in the formed envelope to produce a letter, and the adjustment may include sorting the pieces of page data forming the print data of each letter so that the page data for envelope comes first and the page data for enclosure follows.

In the letter printing system of the invention, the predetermined order may be such that the page data for envelope comes first and the page data for enclosure follows, and the condition of the letter boundary defined by the predetermined order may be that the result of determination of the previous page data is "for enclosure" and the result of determination of the current page data is "for envelope".

In the letter printing system of the invention, the predetermined order may be such that the page data for enclosure comes first and the page data for envelope follows, and the condition of the letter boundary defined by the predetermined order may be that the result of determination of the previous page data is "for envelope" and the result of determination of the current page data is "for enclosure".

According to the letter printing system of the invention, which includes the data processing unit for receiving an instruction to print document data containing letter data of a plurality of letters, generating print data from the document data and outputting the generated print data to a printing unit, and the printing unit for performing, for each letter, printing on a paper sheet for envelope and at least one paper sheet for enclosure according to the print data inputted from the data processing unit and outputting the paper sheet for envelope and the paper sheet for enclosure in the order of printing, the data processing unit determines a letter boundary of each letter in the document data and sequentially outputs print data of each letter to the printing unit, and the printing unit adjusts the order of pieces of page data forming the print data of each letter inputted from the data processing unit according to a predetermined order of output of the paper sheet for envelope and the paper sheet for enclosure for performing inserting and sealing operation, and performs printing according to the adjusted print data. Therefore, pieces of page data of print data of each letter are sorted and sequentially printed without waiting completion of sorting of pieces of page data of the entire document data. This allows arranging the order of output of paper sheets from the printing unit to be appropriate for the inserting and sealing operation while minimizing delay of the start of printing, thereby ensuring productivity.

In the letter printing system of the invention, in the case where the printing unit outputs the paper sheet for envelope and the paper sheet for enclosure subjected to printing in face-up position, and the page data for enclosure forming the print data of each letter includes two or more pieces of page data and the adjustment includes sorting the pieces of page data for enclosure in the reverse order, the two or more pieces of page data for enclosure are printed and the printed paper sheets are outputted in order from the last page, so that the last page of the enclosure is stacked at the bottom and the first page of the enclosure is stacked at the top with the printed surfaces thereof facing up.

DESCRIPTION OF THE PREFERRED EMBODIMENTS

Figure 1:
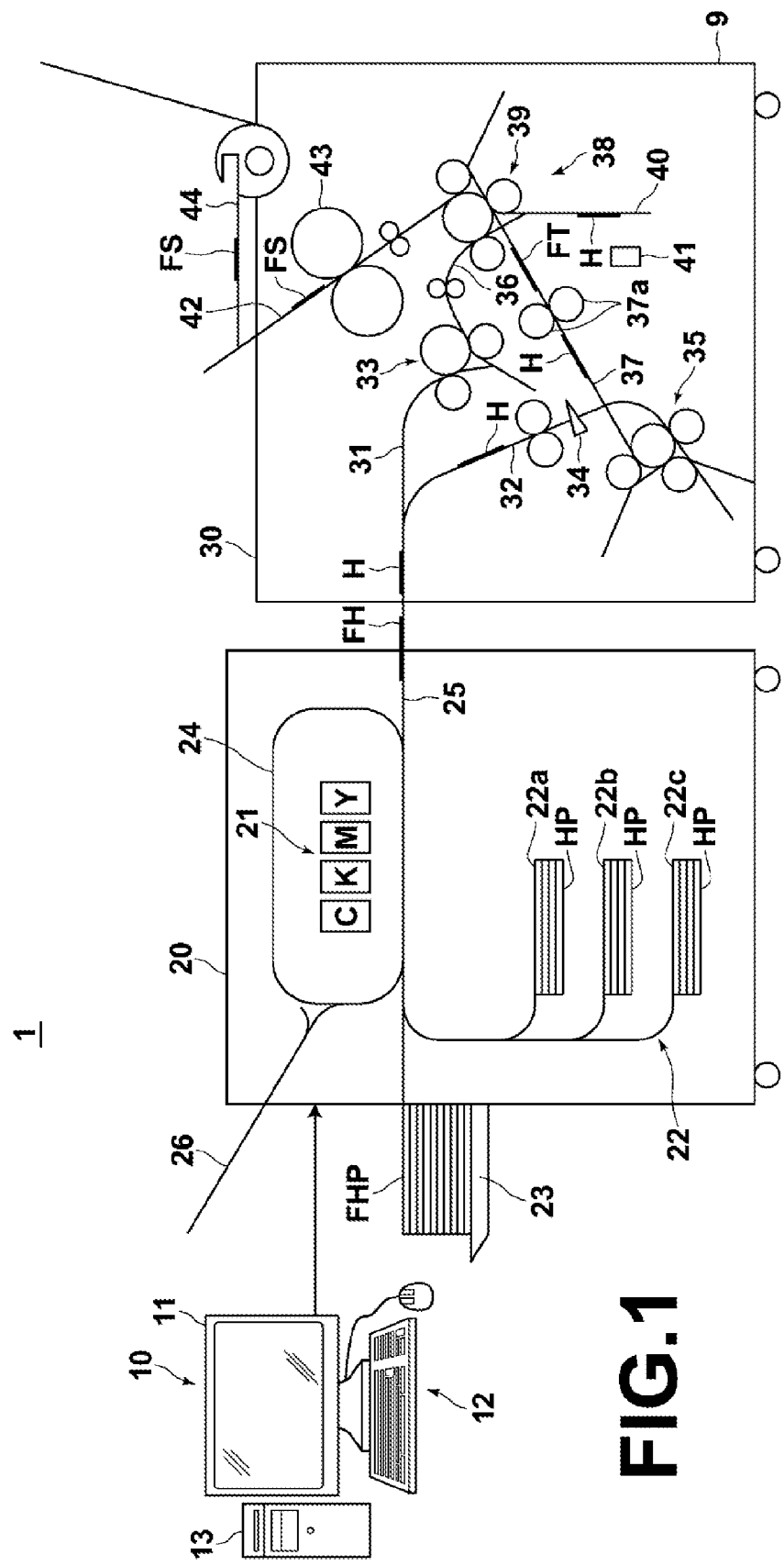
FIG. 1 is a schematic structural diagram of a letter producing system.

Hereinafter, a letter producing system employing a letter printing system according to an embodiment of the present invention will be described in detail with reference to the drawings. FIG. 1 is a schematic structural diagram of a letter producing system 1. As shown in FIG. 1, the letter producing system 1 includes: a data processing unit 10 for receiving an instruction to print document data, generating print data from the document data and outputting the print data to a printing unit 20; the printing unit 20, connected to the data processing unit 10 via a network, such as wired or wireless LAN, for performing printing on a paper sheet for envelope and a paper sheet for enclosure according to the print data inputted from the data processing unit 10 and outputting the paper sheets in the order of printing; and an inserting and sealing unit 30, disposed adjacent to the printing unit 20, for receiving the paper sheet for envelope and the paper sheet for enclosure outputted from the printing unit and producing a letter. The combination of the data processing unit 10 and the printing unit 20 corresponds to the letter printing system of the invention.

Figure 2:
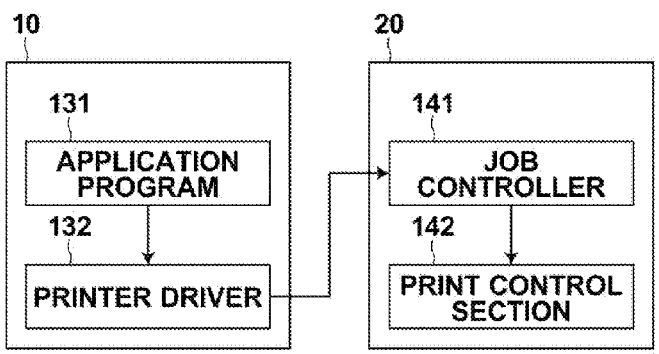
FIG. 2 is a block diagram of the letter printing system.

The data processing unit 10 includes a CPU, a memory, a hard disk, a display device 11, such as a liquid crystal monitor, and an input device 12, such as a keyboard. As shown in FIG. 2, the data processing unit 10 has programs, such as an application program 131 and a printer driver 132, installed therein. The application program 131 generates the document data for producing letter based on operation by the user. The application program 131 may be a program such as Microsoft Word®. In this embodiment, the document data generated with the application program 131 contains letter data of a plurality of letters, where page data for one envelope and page data for at least one enclosure in the letter data of each letter are arranged in a predetermined order such that the page data for envelope comes first and the page data for enclosure follows, for example.

The printer driver 132 receives an instruction to print the document data, generates print data, which is readable by the printing unit 20, from the document data, and outputs the print data to the printing unit 20. The print data may, for example, be data described with PDL (Page Description Language).

In a case where the document data relating to the instruction to print contains letter data of two or more letters, the printer driver 132 of the letter producing system 1 sequentially recognizes a letter boundary between pieces of letter data in the document data from the beginning of data, and outputs, to the printing unit 20, a set of page data between one letter boundary and the next letter boundary as data belonging to print data of each letter. Outputting a set of page data as data belonging to print data of each letter to the printing unit 20 refers to that the set of page data is outputted in such a manner that the printing unit 20 can recognize that the set of page data belongs to letter data that is different from the other sets of page data. For example, a command indicating a letter boundary may be outputted immediately before and immediately after the set of page data is outputted, or specific codes indicating the start of letter and the end of letter may be added at the beginning and the end of the set of page data to be outputted.

For each piece of page data for envelope and page data for enclosure forming the document data, the printer driver 132 sequentially determines, from the beginning of data, whether the current page data is for envelope or for enclosure based on the page data. With respect to the third and the following pieces of page data, the printer driver 132 further determines whether or not a combination of the result of determination of the current page data and the result of determination of the previous page data satisfies a condition of letter boundary defined by the predetermined order. Then, if it is determined that the condition of letter boundary are satisfied, a letter boundary is recognized between two pieces of page data involved in the determination.

Figure 3:
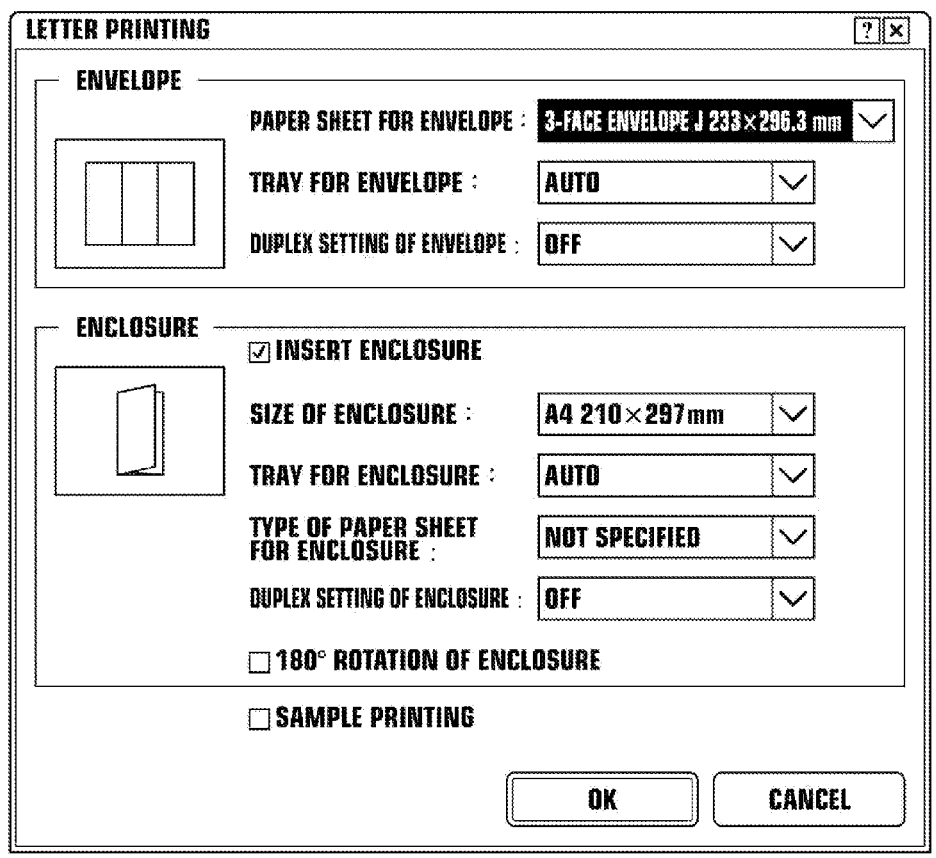
FIG. 3 shows a setting screen of a user interface.

The determination as to whether the current page data is for envelope or for enclosure is achieved by referencing information of page size of the page data in the header field of the page data and comparing the page size of the current page data with a page size of page data for envelope that is set and stored in advance. Specifically, if the page size of the current page data is the same as the page size of page data for envelope, it is determined that the current page data is for envelope. If the page size of the current page data is different from the page size of page data for envelope, it is determined that the current page data is for enclosure. The printer driver 132 causes a setting screen, as shown in FIG. 3, for example, to be displayed, and receives settings about various print conditions, including the page size of page data for envelope, by the user in advance. It should be noted that the item "PAPER SHEET FOR ENVELOPE" shown in FIG. 3 corresponds to the page size of page data for envelope.

The condition of the letter boundary is defined by the order in which the page data for envelope and the page data for enclosure in the letter data of each letter are arranged. In a case where the page data for envelope comes first and the page data for enclosure follows in the letter data of each letter, for example, the condition of the letter boundary is that the previous page data is for enclosure and the current page data is for envelope. In a case where the page data for enclosure comes first and the page data for envelope follows in the letter data of each letter, the condition of the letter boundary is that the previous page data is for envelope and the current page data is for enclosure. This embodiment is described with respect to the case where the page data for envelope comes first and the page data for enclosure follows in the letter data of each letter.

Figure 4:
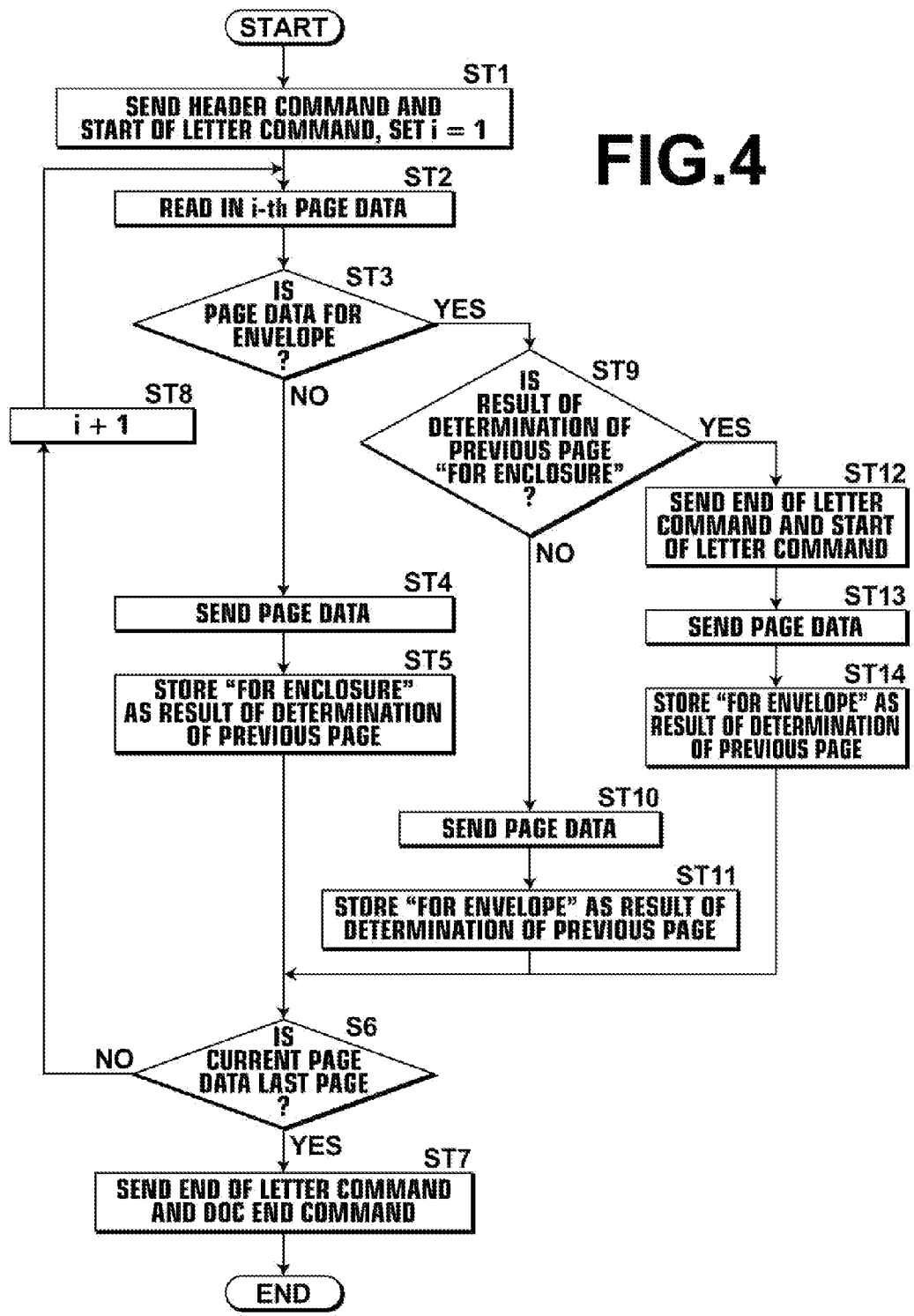
FIG. 4 is a flow chart illustrating a process performed by a printer driver.

Now, the flow of a process performed by the printer driver 132 is described with reference to the flow chart shown in FIG. 4. As the printer driver 132 receives an instruction to print the document data containing letter data of a plurality of letters, the printer driver 132 first sends a header command and a start of letter command to the printing unit 20 and assigns an initial value of 1 to a count i (ST1). Then, the printer driver 132 reads in the i-th page data forming the document data from the application program 131 (ST2). Then, the printer driver 132 obtains information of page size of the page data described in the header field of the read-in page data, and determines whether or not the page size of the current page data is the same as the page size of page data for envelope set and stored in advance to determine whether or not the current page data is for envelope (ST3).

If it is determined in step ST3 that the current page data is not for envelope (that is, it is for enclosure) (ST3: NO), the printer driver 132 sends the current page data to the printing unit 20 (ST4) and stores the result of determination, "for enclosure", of the current page data as the "result of determination of the previous page" (ST5). Then, the process proceeds to the next step ST6. In contrast, if it is determined in step ST3 that the current page data is for envelope (ST3: YES), the printer driver 132 further determines whether or not the result of determination stored as the result of determination of the previous page is "for enclosure" (ST9). If it is determined in step ST9 that the result of determination stored as the result of determination of the previous page is not "for enclosure" (ST9: NO), the printer driver 132 sends the current page data to the printing unit 20 (ST10) and stores the result of determination, "for envelope", of the current page data as the result of determination of the previous page (ST11). Then, the process proceeds to step ST6.

In contrast, if it is determined in step ST9 that the result of determination stored as the result of determination of the previous page is "for enclosure" (ST9: YES), the printer driver 132 sends an end of letter command and the start of letter command to the printing unit 20 (ST12), and then sends the page data read in in step ST2 to the printing unit 20 (ST10). Then, the printer driver 132 stores the result of determination, "for envelope", of the current page data as the result of determination of the previous page (ST11), and the process proceeds to step ST6. In step ST6, the printer driver 132 determines whether or not the current page data is the last page of the document data (ST6). If it is determined that the current page data is not the last page, the printer driver 132 increments the count i by 1 (ST8), and the process returns to step ST2. In contrast, if it is determined that the current page data is the last page of the document data, the printer driver 132 sends the end of letter command and an end of job command (DocEnd) to the printing unit 20 (ST7), and the process ends.

Figure 5:
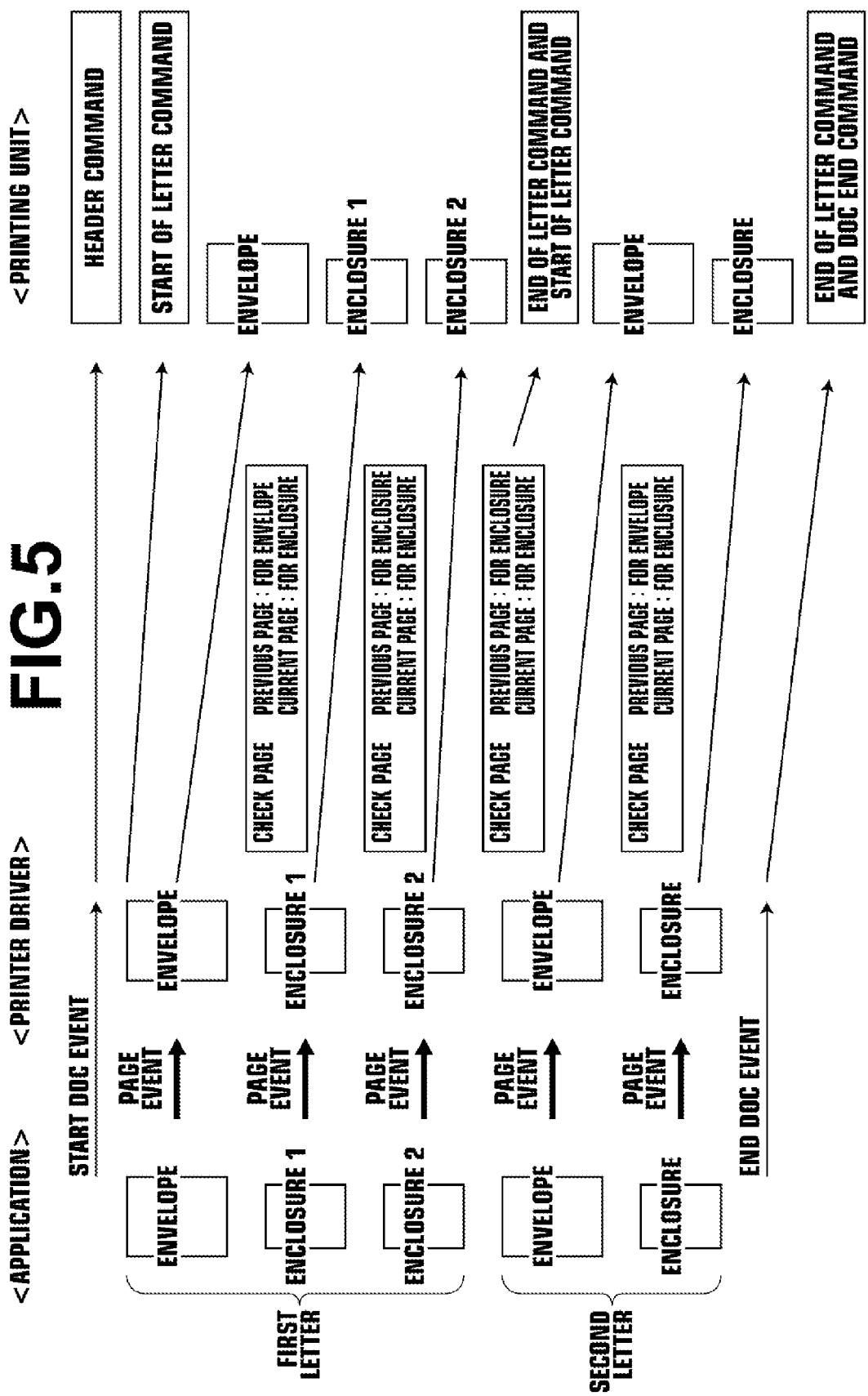
FIG. 5 is a schematic diagram illustrating the outline of the process performed by the printer driver.

Next, the outline of the process performed by the printer driver 132 when an instruction to print the document data shown in FIG. 5 is received is described. The document data shown in FIG. 5 contains letter data of the first letter, where three pieces of page data are arranged in the order of "page data for envelope—page data for enclosure—page data for enclosure", and letter data of the second letter, where two pieces of page data are arranged in the order of "page data for envelope—page data for enclosure".

In this case, the printer driver 132 first sends the header command and the start of letter command to the printing unit 20, and reads in the first piece of page data forming the document data from the application program 131. Then, the printer driver 132 determines whether or not the read-in page data is for envelope. With respect to the document data shown in FIG. 5, it is determined that the first piece of page data is for envelope. In response to this result of determination, the printer driver 132 determines whether or not the result of determination stored as the result of determination of the previous page is "for enclosure". When the instruction to print is received, the result of determination of the previous page is reset into a default value other than "for enclosure", and therefore, it is determined now that the result of determination stored as the result of determination of the previous page is not "for enclosure". In response to this result of determination, the printer driver 132 sends the first piece of page data to the printing unit 20, and stores the result of determination, "for envelope", of the current page data as the result of determination of the previous page.

Subsequently, the printer driver 132 reads in the second piece of page data, and determines whether or not the read-in page data is for envelope. With respect to the document data shown in FIG. 5, it is determined that the second piece of page data is for enclosure. In response to this result of determination, the printer driver 132 sends the second piece of page data to the printing unit 20, and stores the result of determination, "for enclosure", of the current page data as the result of determination of the previous page (i.e., updates the result of determination of the previous page). Subsequently, the printer driver 132 reads in the third piece of page data, and determines whether or not the read-in page data is for envelope. With respect to the document data shown in FIG. 5, it is determined that the third piece of page data is for enclosure. In response to this result of determination, the printer driver 132 sends the third piece of page data to the printing unit 20, and stores the result of determination, "for enclosure", of the current page data as the result of determination of the previous page (i.e., updates the result of determination of the previous page).

Subsequently, the printer driver 132 reads in the fourth piece of page data, and determines whether or not the read-in page data is for envelope. With respect to the document data shown in FIG. 5, it is determined that the fourth piece of page data is for envelope. In response to this result of determination, the printer driver 132 further determines whether or not the result of determination stored as the result of determination of the previous page is "for enclosure". At this time, the result of determination stored as the result of determination of the previous page is "for enclosure". In response to this result of determination, the printer driver 132 sends the end of letter command and the start of letter command to the printing unit 20. Further, the printer driver 132 sends the fourth piece of page data to the printing unit 20, and stores the result of determination, "for envelope", of the current page data as the result of determination of the previous page (i.e., updates the result of determination of the previous page).

Subsequently, the printer driver 132 reads in the fifth piece of page data, and determines whether or not the read-in page data is for envelope. With respect to the document data shown in FIG. 5, it is determined that the fifth piece of page data is for enclosure. In response to this result of determination, the printer driver 132 sends the fifth piece of page data to the printing unit 20, and stores the result of determination, "for enclosure", of the current page data as the result of determination of the previous page (i.e., updates the result of determination of the previous page). Since the current page data is the last page of the document data, the printer driver 132 sends the end of letter command and the end of job command to the printing unit 20, and the process ends.

The printing unit 20 performs printing on the paper sheets for envelope and the paper sheets for enclosure according to the print data sent from the printer driver 132 of the data processing unit 10, and outputs the paper sheets to the inserting and sealing unit 30 in the order of printing. As shown in FIG. 1, the printing unit 20 includes a printing section 21, a paper feeding section 22 and a conveyance section 24. The paper feeding section 22 feeds printing paper sheets, on which printing is performed. The paper feeding section 22 includes paper feeding trays 22a, 22b and 22c containing paper sheets H for enclosure, a paper feeding tray 23 containing the paper sheets H for envelope, and a paper feeding mechanism (not shown), such as paper feeding rollers, which picks up each paper sheet FH for envelope or paper sheet H for enclosure contained in each paper feeding tray and guides it onto the paper feeding path. The printing section 21 performs printing by ejecting inks onto each paper sheet FH for envelope or paper sheet H for enclosure conveyed thereto and conveys out the printed paper sheet. The printing section 21 includes a plurality of line-type ink heads for ejecting inks of different colors, such as black K, cyan C, magenta M and yellow Y.

The conveyance section 24 conveys each paper sheet FH for envelope, which is fed from the paper feeding tray 23, and each paper sheet H for enclosure, which is fed from the paper feeding tray 22, from the upstream side to the downstream side of the printing section 21. In the case of simplex printing, the conveyance path 24 passes each paper sheet FH for envelope or paper sheet H for enclosure with one face thereof subjected to printing at the printing section 21 to a connecting conveyance path 25. In the case of duplex printing, the conveyance path 24 conveys each paper sheet FH for envelope or paper sheet H for enclosure with one face thereof subjected to printing to an inverting section 26, and conveys the paper sheet FH for envelope or paper sheets H for enclosure inverted at the inverting section 26 again from the upstream side to the downstream side of the printing section 21. Then, the conveyance path 24 passes each paper sheet FH for envelope or paper sheet H for enclosure with the other face thereof subjected to printing at the printing section 21 to the connecting conveyance path 25. Then, each paper sheet FH for envelope or paper sheet H for enclosure received by the connecting conveyance path 25 is fed to the inserting and sealing unit 30.

As shown in FIG. 2, the printing unit 20 includes a job controller 141 and a print control section 142. The job controller 141 adjusts the order of pieces of page data forming the print data of each letter sent from the data processing unit 10 such that the paper sheet for envelope and the paper sheets for enclosure of each letter subjected to printing at the printing unit 20 are outputted in a predetermined order of output for inserting and sealing operation, and provides the adjusted print data of each letter to the print control section 142. The print control section 142 controls the individual sections of the printing unit 20, such as the paper feeding section 22, according to the adjusted print data provided from the job controller 141 to perform printing.

The predetermined order of output for inserting and sealing operation, which is used to adjust the order of the pieces of page data, is defined based on the orientation of the printed surface when the paper sheet for envelope and the paper sheets for enclosure subjected to printing is outputted from the printing unit 20 and how the paper sheets fed to the inserting and sealing unit 30 are processed at the inserting and sealing unit 30. For example, in a case where the printing unit 20 outputs the paper sheet for envelope and the paper sheets for enclosure subjected to printing in face-up position, and the inserting and sealing unit 30 is configured to sequentially feed the paper sheets of one letter outputted from the printing unit 20 in the order of output, recognize the first-fed paper sheet(s) as the paper sheet(s) for enclosure and the last-fed paper sheet as the paper sheet for envelope, fold the paper sheet recognized as the paper sheet for envelope to form an envelope, and insert and seal the paper sheet(s) recognized as the paper sheet(s) for enclosure in the formed envelope to produce a letter, the predetermined order of output for inserting and sealing operation is such that the page data for enclosure comes first and the page data for envelope follows. Further, if the page data for enclosure includes two or more pieces of page data, the pieces page data for enclosure are sorted in the reverse order.

Figure 7:
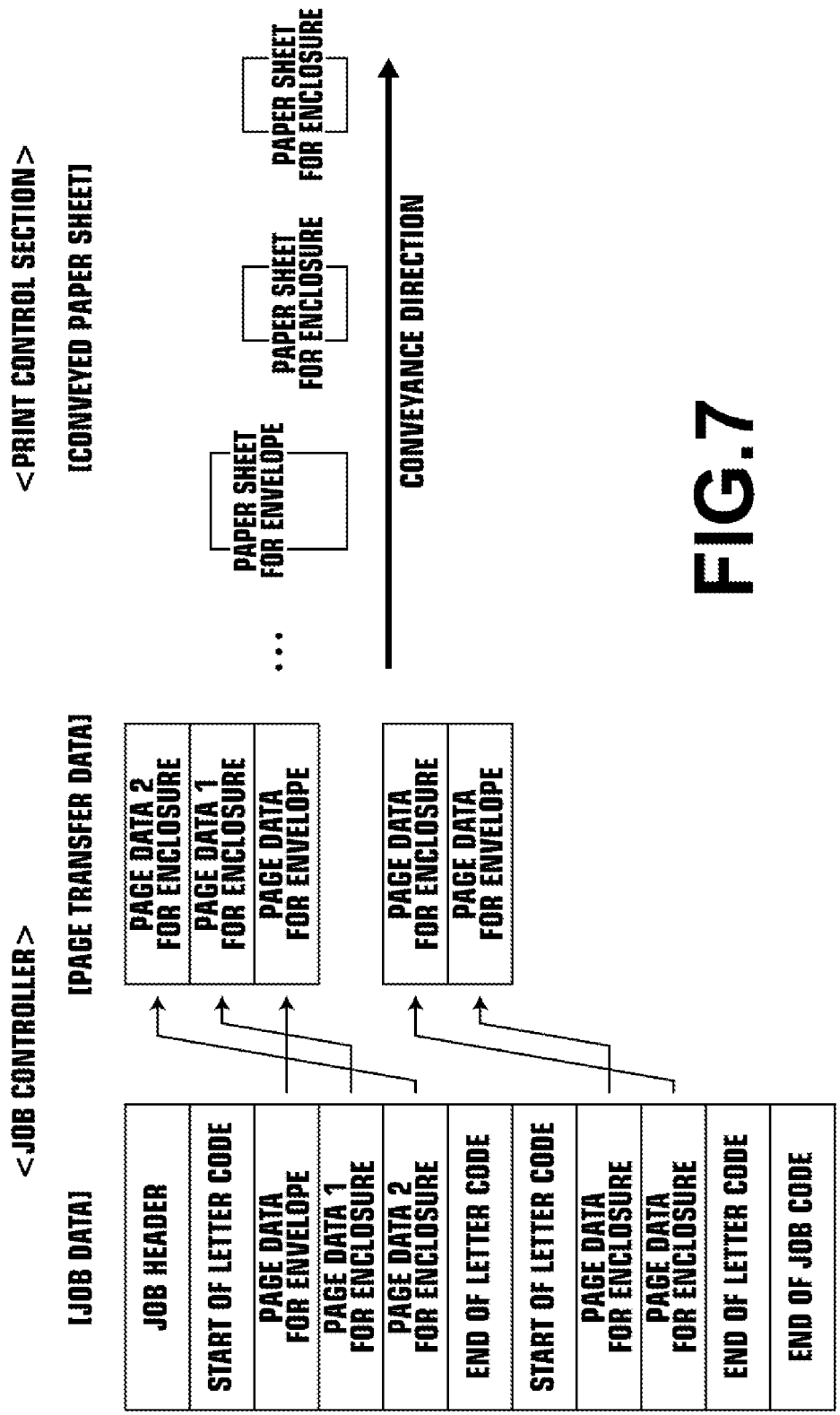
FIG. 7 is a schematic diagram illustrating the outline of a process performed by a printing unit.

The following description of this embodiment is made with respect to the case where the predetermined order of output for inserting and sealing operation is such that the page data for enclosure comes first and the page data for envelope follows, and if the page data for enclosure includes two or more pieces of page data, the pieces of page data for enclosure are further sorted in the reverse order. In this case, the job controller 141 adjusts the order of pieces of page data forming the print data of each letter by sorting them so that the page data for enclosure comes first and the page data for envelope follows, and if the page data for enclosure includes two or more pieces of page data, further sorting the pieces of page data for enclosure in the reverse order, as shown in FIG. 7, for example. Then, the job controller 141 provides the sorted print data of each letter to the print control section 142. It should be noted that the item "job data" shown in FIG. 7 corresponds to the order of pieces of page data before adjustment and the item "page transfer data" shown in FIG. 7 corresponds to the adjusted order of the pieces of page data to be provided to the print control section 142.

Figure 6:
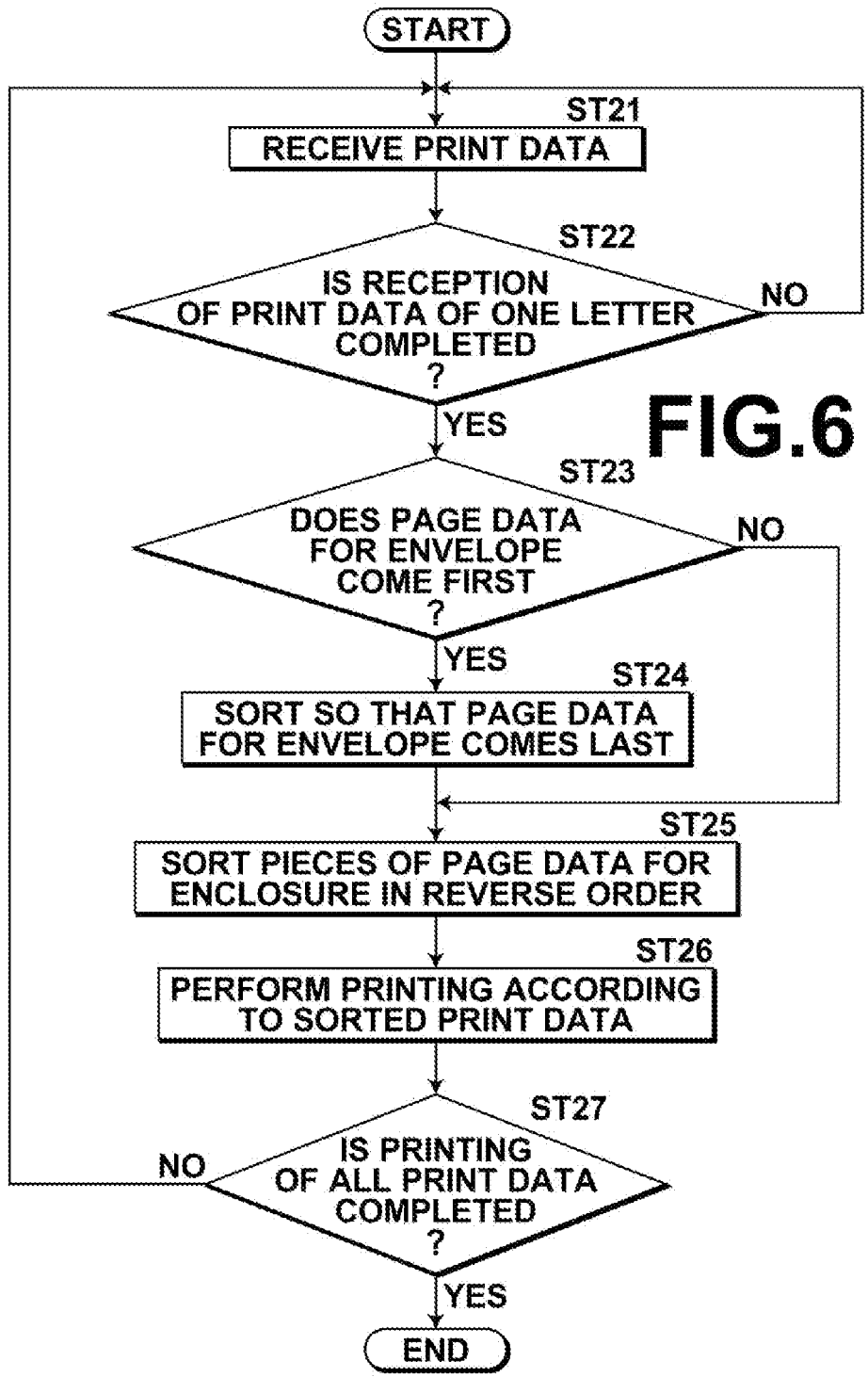
FIG. 6 is a flow chart illustrating a process performed by a job controller.

Now, the flow of a process performed by the printing unit 20 is described with reference to the flow chart shown in FIG. 6. First, the job controller 141 sequentially receives print data of each page relating to the instruction to print from the data processing unit 10 (ST21), and repeatedly determines whether or not reception of print data of one letter is completed (ST22). The determination as to whether or not reception of print data of one letter is completed is achieved by determining whether or not the end of letter command is sent from the printing unit 20.

If it is determined in step ST22 that the reception of print data of one letter is completed, the job controller 141 recognizes the print data that is received after the previous start of letter command is received and before the end of letter command is received as the print data of one letter. Then, the job controller 141 analyzes the arrangement of the page data for envelope and the page data for enclosure forming the print data of one letter, and determines whether or not the page data for envelope comes before the page data for enclosure (ST23). If a negative determination is made in step ST23, the process proceeds to step ST25. If an affirmative determination is made in step ST23, the page data for envelope is moved to the end of the print data of one letter (ST24), and the process proceeds to step ST25. In step ST25, the job controller 141 further sorts all the pieces of page data for enclosure forming the print data of one letter in the reverse order, and provides the sorted print data of one letter to the print control section 142.

Then, the print control section 142 controls the individual sections, such as the paper feeding section 22, of the printing unit 20 according to the print data provided from the job controller 141 to perform printing (ST26). Thereafter, the job controller 141 determines whether or not printing of all the print data is completed (ST27). The operations in step ST21 and the following steps are repeated until it is determined that printing of all the print data is completed. The determination as to whether or not printing of all the print data is completed is achieved by determining whether or not the end of job command is sent from the printing unit 20.

The inserting and sealing unit 30 produces a letter by making an envelope FT using the paper sheet FH for envelope outputted from the printing unit 20, and then folding the paper sheet(s) H for enclosure in three, four, or the like, and inserting the paper sheet(s) H for enclosure in the envelope FT. As shown in FIG. 1, the inserting and sealing unit 30 includes a first conveyance path 31 for conveying the paper sheet FH for envelope fed from the connecting conveyance path 25 of the printing unit 20 to the first folding section 33, and a second conveyance path 32 for conveying the paper sheet(s) H for enclosure fed from the connecting conveyance path 25 to the second folding section 35. Switching between the first conveyance path 31 and the second conveyance path 32 is achieved by means of a flap (not shown).

The first folding section 33, which folds the paper sheet FH for envelop to make the envelope FT, is disposed at the terminating end of the first conveyance path 31. The first folding section 33 is formed by a plurality of rubber rollers, which are longer than the width of the paper sheet FH for envelope. A third conveyance path 36 extends from the first folding section 33. The third conveyance path 36 conveys the paper sheet for envelope FH folded at the first folding section 33 to the inserting and sealing section 38.

An aligning section 34 is disposed in the middle of the second conveyance path 32. The aligning section 34 is configured to temporarily store the paper sheets H for enclosure conveyed via the second conveyance path 32 in a state where the paper sheets H for enclosure are stacked one on the other. The second folding section 35 for folding the paper sheet(s) H for enclosure is disposed at the terminating end of the second conveyance path 32. The second folding section 35 is formed by a plurality of rubber rollers, which are longer than the width of the paper sheet H for enclosure.

A fourth conveyance path 37 extends from the second folding section 35. The fourth conveyance path 37 conveys the paper sheet(s) H for enclosure folded at the second folding section 35 to the inserting and sealing section 38. That is, the above-described third conveyance path 36 and the fourth conveyance path 37 meet at the inserting and sealing section 38. Conveyance rollers 37a are disposed in the middle of the fourth conveyance path 37, and the paper sheet(s) H for enclosure conveyed via the fourth conveyance path 37 temporarily waits at the position of the conveyance rollers 37a.

The inserting and sealing section 38 includes a third folding section 39. The third folding section 39 further folds the paper sheet FH for envelope folded at the first folding section 33, as necessary. The third folding section 39 is also formed by a plurality of rubber rollers, which are longer than the width of the paper sheet FH for envelope. The inserting and sealing section 38 also includes a fifth conveyance path 40 extending downward from the third folding section 39. The hydration section 41 is disposed in the vicinity of the fifth conveyance path 40. The hydration section 41 applies water to the paper sheet FH for envelope, so that portions of the paper sheet FH for envelope become adhesive for adhesion.

After the adhesion of the paper sheet FH for envelope, the fourth conveyance path 37 advances the paper sheet(s) H for enclosure, which has been temporarily waited, toward the envelope FT by the conveyance rollers 37a. The third folding section 39 conveys the paper sheet(s) H for enclosure so that the paper sheet(s) H for enclosure is inserted in the paper sheet FH for envelope, forms the envelope FT and seals the paper sheets H for enclosure in the envelope FT. A sixth conveyance path 42 extends diagonally upward from the third folding section 39.

Pressure rollers 43 forming part of the inserting and sealing section 38 are disposed in the middle of the sixth conveyance path 42. The pressure rollers 43 nip opposite edges in the width direction of the envelope FT, which contains the paper sheet(s) H for enclosure, from above and below to apply pressure thereto to achieve the sealing to form a letter. The letter passed through the pressure rollers 43 is temporarily stopped in the middle of the sixth conveyance path 42, as necessary, until the sealing is completed, and then is outputted onto a paper output tray 44 via the sixth conveyance path 42.

According to the above-described configuration of this embodiment, when an instruction to print document data containing letter data of a plurality of letters is received and printing is performed, pieces of page data of print data of each letter are sorted and sequentially printed without waiting completion of sorting of pieces of page data of the entire document data. This allows arranging the order of output of paper sheets from the printing unit to be appropriate for the inserting and sealing operation while minimizing delay of the start of printing, thereby ensuring productivity.

It should be noted that, while the case where the document data relating to the instruction to print is generated with the application program 131 included in the data processing unit 10 is described in the above-described embodiment, the document data may be generated and sent from another data processing unit.

Further, while the case where the page data for envelope comes first and the page data for enclosure follows in the letter data of each letter is described in the above-described embodiment, the page data for enclosure may come first and the page data for envelope may follow in the letter data of each letter.

Still further, while the case where the job controller 141 adjusts the order of pieces of page data by sorting the print data of each letter so that the page data for enclosure comes first and the page data for envelope follows, and if the page data for enclosure includes two or more pieces of page data, further sorting the pieces of page data for enclosure in the reverse order is described in the above-described embodiment, the order of the sorted pieces of page data may be changed, as appropriate, depending on the orientation of the printed surface when the paper sheet for envelope and the paper sheet(s) for enclosure subjected to printing are outputted from the printing unit 20 and how the paper sheets fed to the inserting and sealing unit 30 is processed at the inserting and sealing unit 30.

Specifically, in a case where the printing unit outputs the paper sheet for envelope and the paper sheet(s) for enclosure subjected to printing in face-up position to the inserting and sealing unit that is configured to sequentially feed the paper sheets of one letter, which are outputted from the printing unit, in the order of output, recognize the first-fed paper sheet as the paper sheet for envelope and the following paper sheet(s) as the paper sheet(s) for enclosure, fold the paper sheet recognized as the paper sheet for envelope to form an envelope, and insert and seal the paper sheet(s) recognized as the paper sheet(s) for enclosure in the formed envelope to produce a letter, the job controller 141 sorts pieces of page data forming the print data of each letter so that the page data for envelope comes first and the page data for enclosure follows, and if the page data for enclosure includes two or more pieces of page data, further sorts the pieces of page data for enclosure in the reverse order.

In a case where the printing unit outputs the paper sheet for envelope and the paper sheet(s) for enclosure subjected to printing in face-down position to the inserting and sealing unit that is configured to sequentially feed the paper sheets of one letter, which are outputted from the printing unit, in the order of output, recognize the first-fed paper sheet(s) as the paper sheet(s) for enclosure and the last-fed paper sheet as the paper sheet for envelope, fold the paper sheet recognized as the paper sheet for envelope to form an envelope, and insert and seal the paper sheet(s) recognized as the paper sheet(s) for enclosure in the formed envelope to produce a letter, the job controller 141 sorts pieces of page data forming the print data of each letter such the page data for enclosure comes first and the page data for envelope follows.

In a case where the printing unit outputs the paper sheet for envelope and the paper sheet(s) for enclosure subjected to printing in face-down position to the inserting and sealing unit that is configured to sequentially feed the paper sheets of one letter, which are outputted from the printing unit, in the order of output, recognize the first-fed paper sheet as the paper sheet for envelope and the following paper sheet(s) as the paper sheet(s) for enclosure, fold the paper sheet recognized as the paper sheet for envelope to form an envelope, and insert and seal the paper sheet(s) recognized as the paper sheet(s) for enclosure in the formed envelope to produce a letter, the job controller 141 sorts pieces of page data forming the print data of each letter so that the page data for envelope comes first and the page data for enclosure follows.

What is claimed is:

1. A letter printing system comprising:
a data processing unit configured to receive an instruction to print document data containing first letter data of a plurality of letters, generating print data from the document data and outputting the generated print data to a printing unit, wherein the first letter data of each of the plurality of letters includes page data for one envelope and page data for at least one enclosure, and wherein the page data for one envelope and page data for each of at least one enclosure are arranged in a predetermined order; and
the printing unit configured to perform, for each letter, printing the page data for one envelope on a paper sheet for envelope and printing the page data for at least one enclosure on at least one paper sheet for enclosure according to the print data inputted from the data processing unit and outputting the paper sheet for envelope and the paper sheet for enclosure in the order of printing,
wherein the data processing unit is further configured to determine a letter boundary that represents a boundary between each piece of page data for each enclosure of each letter in the document data and sequentially outputs print data of each letter to the printing unit,
wherein the printing unit is further configured to adjust the order of pieces of page data forming the print data of each letter inputted from the data processing unit according to a predetermined order of output of the paper sheet for envelope and the paper sheet for enclosure for performing an inserting and sealing operation, and performs printing according to the adjusted print data,
wherein the data processing unit is configured to sequentially determine, for each page data from the beginning of the document data, based on each page data, whether each page data in the document data is page data for an envelope or page data for an enclosure,
wherein the data processing unit is further configured to determine for each page data from a new set of letter data as counted in order of arrangement from the first letter data of the document data, based on a combination of the determination of whether current page data is page data for an envelope or page data for an enclosure, and whether previous page data immediately before the current data is page data for an envelope or page data for an enclosure, the letter boundary between letters by judging whether the combination satisfies a condition of the letter boundary defined by the predetermined order of the page data, and outputs a set of page data between a previous letter boundary immediately before the currently-set letter boundary and the currently-set letter boundary, as data belonging to the printing data of each letter, and
wherein the printing unit is further configured to adjust the order of page data belonging to the print data for each letter inputted from the data processing unit so as to output the paper sheet for envelope and the paper sheet for enclosure in a predetermined order for performing the inserting and sealing operation on the paper sheets, and to perform printing in the adjusted order.

2. The letter printing system as claimed in claim 1, wherein, if the printing unit outputs the paper sheet for envelope and the paper sheet for enclosure subjected to printing in face-up position and the page data for enclosure forming the print data of each letter includes two or more pieces of page data, the adjustment comprises sorting the pieces of page data for enclosure in the reverse order.

3. The letter printing system as defined in claim 1, wherein:
the data processing unit determines whether each piece of page data is data for an envelope or data for an enclosure, based on data included in each piece of page data.

4. The letter printing system as defined in claim 3, wherein:
each piece of page data has a header portion; and
the data processing unit determines whether each piece of page data is data for an envelope or data for an enclosure, based on data included in the header portion of each piece of page data.

5. The letter printing system as defined in claim 4, wherein:
each piece of page data has a header portion; and
the data processing unit determines whether each piece of page data is data for an envelope or data for an enclosure, based on data regarding the page size of each piece of page data included in the header portion of each piece of page data.

* * * * *